H. R. VAN DEVENTER.
GOVERNOR FOR GAS ENGINES OR THE LIKE.
APPLICATION FILED JAN. 17, 1917.

1,319,256.

Patented Oct. 21, 1919.
2 SHEETS—SHEET 2.

UNITED STATES PATENT OFFICE.

HARRY RANDOLPH VAN DEVENTER, OF SUMTER, SOUTH CAROLINA, ASSIGNOR TO SPLITDORF ELECTRICAL COMPANY, OF NEWARK, NEW JERSEY, A CORPORATION OF NEW JERSEY.

GOVERNOR FOR GAS-ENGINES OR THE LIKE.

1,319,256.

Specification of Letters Patent.

Patented Oct. 21, 1919.

Application filed January 17, 1917. Serial No. 142,871.

*To all whom it may concern:*

Be it known that I, HARRY R. VAN DEVENTER, a citizen of the United States, residing at Sumter, in the county of Sumter and State of South Carolina, have invented certain new and useful Improvements in Governors for Gas-Engines or the like, of which the following is a specification, reference being had to the accompanying drawing.

The invention relates to new and useful improvements in governors for gas engines or the like for controlling the maximum speed of the engine.

An object of the invention is to provide a governing means for a gas engine or other device which is operated by an ignition spark, which governing means controls the maximum speed of the engine through a control of the ignition current generated by the engine.

Another object of the invention is to provide a governing device of the above character wherein centrifugal force acting on a part movable by the engine may be utilized for controlling the ignition current and thus controlling the maximum speed of the engine.

A further object of the invention is to provide a governing means of the above character wherein the ignition current is controlled either by breaking or short circuiting the primary circuit of the generator through the opening or closing of contacts which in turn are controlled by the speed of the engine.

These and other objects will in part be obvious and will in part be hereinafter more fully disclosed.

In the drawings, which show by way of illustration one embodiment of the invention:—

Figure 1:
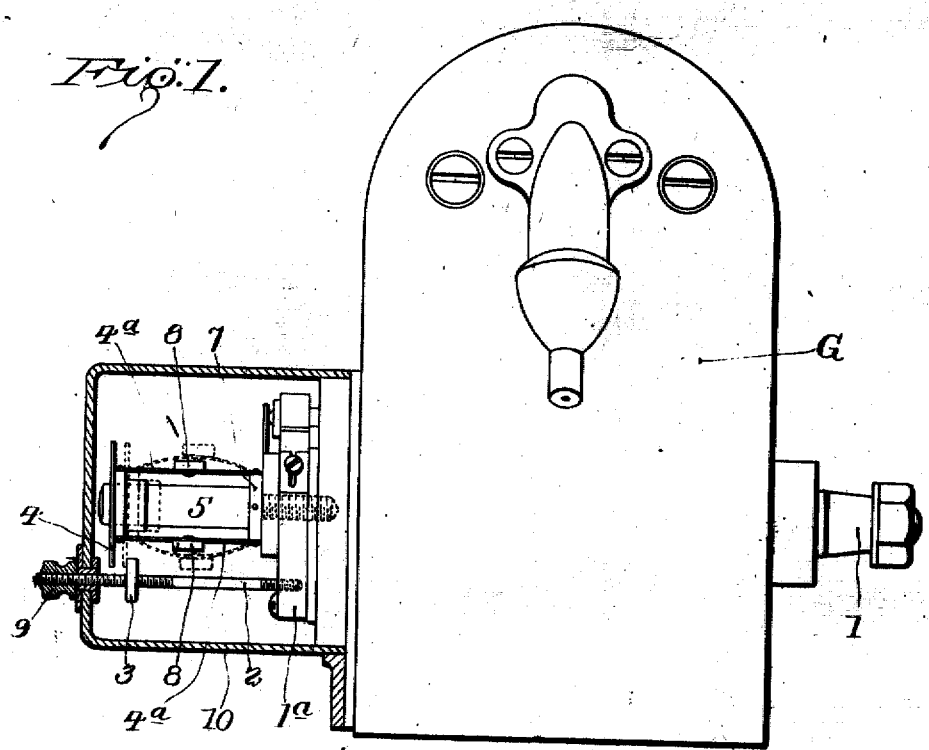
Figure 1 is a view, partly in side elevation and partly in section, showing a generator having my improved governing means connected thereto.
Figure 2:
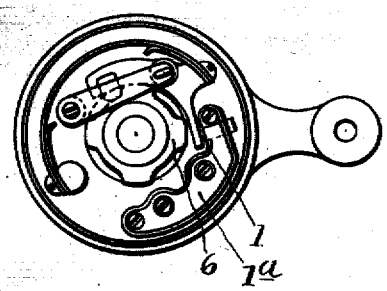
Fig. 2 is a detail, showing the interrupter in side elevation which controls the primary circuit of the generator.

The present invention is directed to a governor for internal combustion engines or other similar devices which are operated by ignition current. The ignition current is supplied to spark devices which ignite the charge in the usual manner. The invention consists broadly in providing a governor which is actuated by the engine and which operates when the engine reaches a predetermined speed to render ineffective the generator for supplying ignition current to the spark device, thus reducing the speed of the engine, and when the speed of the engine has dropped below a predetermined speed, then the governor automatically again causes the generator to become effective to furnish the ignition current to the spark devices, and thus the speed of the engine is automatically controlled by controlling the ignition current generated. I use an electric generator as a source of current supply, which may be of any of the standard types, and includes a primary and a secondary circuit, the primary circuit being interrupted to produce the ignition current in the secondary coil. This primary circuit is controlled by a governor which is actuated by the engine so that the speed of the governor is determined by the speed of the engine. When the engine reaches a predetermined desired speed, this governor automatically operates to cut out the primary circuit either by opening the circuit or short circuiting the same, and this prevents the generating of ignition current in the secondary circuit.

This governor consists of a weighted member operated upon by centrifugal force which opens and closes controlling contacts depending upon the speed of the engine. In the case of short circuiting the primary circuit, then the contacts are closed when the engine reaches a predetermined speed. In the case of opening the primary circuit, then, of course, the contacts would be opened when the speed of the engine reaches the desired point. The primary circuit, of course, is provided with its usual interrupter contacts and a condenser may be bridged across the interrupter contacts.

Referring more in detail to the drawings:

I have illustrated one form of the invention wherein the primary circuit is short circuited when the engine reaches a predetermined speed. The engine has not been illustrated in the drawings, but may be of any desired character and connected to the engine is an electric generator G having a shaft 1 which carries the ordinary wound armature or the ordinary rotor depending upon the type of the generator selected. This shaft 1 is connected to the engine shaft so as to rotate therewith and the speed of the shaft of the generator depends upon the speed of the shaft of the engine. In carrying out my invention, I prefer to use a magneto of the well-known "Dixie" type, wherein the ignition current is generated in the secondary of a stationary generating coil, and current is supplied to the primary through a rotor operated by the main shaft of the magneto.

Figure 3:
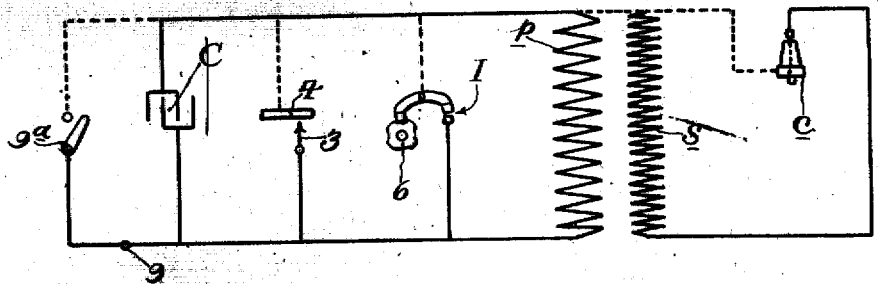
Fig. 3 is a view showing diagrammatically the windings of the generator and the arrangement of the circuit breaker, the interrupter, and the condenser relative thereto.

In Fig. 3 of the drawings, I have shown diagrammatically the stationary generating coil of such a magneto in which the primary circuit is indicated at $p$ while the secondary circuit is indicated at $s$. The secondary circuit is connected with the spark device of the engine which is indicated at $c$. The primary circuit is connected with interrupter contacts which are indicated at 1. These interrupter contacts may be of the usual construction and include an insulated member, indicated at 1$^a$, on which is mounted a post 2, which post is screwed into the insulated member at one end but not far enough to become grounded. Mounted on this post 2 is an adjustable collar 3, which may be shifted on the post by turning the same about the post. Rotating with the main shaft of the generator is an elongated section 5 thereof, and this elongated section of the shaft carries the regular interrupter cam 6 which controls the interrupter contacts I, and this elongated part of the shaft also carries the governor. The governor is of the well-known "phonograph" type.

A metal disk 4 is attached by means of spring arms 4$^a$ to a collar 7 which is fixed to the elongated portion 5 of the shaft so as to rotate therewith. These arms 4$^a$ have mounted thereon governor weights 8. As the shaft rotates, these weights, through the action of centrifugal force thereon, will be moved out away from the center of the shaft 5, and as these arms 4$^a$ are bowed through the action of the weights thereon, the disk 4 will be moved in toward the collar 3 on the post 2. The post 2 carries a nut 9 to, which a wire leading to the usual grounding switch 9$^a$ may be connected for permanently short circuiting the magneto, thereby stopping the engine. The disk 4 and the collar 3 are connected to the primary circuit, and the interrupter as shown, and when the disk 4 engages the collar 3, then the interrupter I and the primary coil will be short circuited as long as the collar 3 and the disk 4 are in contact. The collar 3, as above noted, is adjustable on the post 2, and the speed at which the disk 4 engages the collar 3 is determined by the position of the collar 3.

It will be noted that the post 2, which is really the terminal for the interrupter mechanism and also the governing device, serves as a means for securing an inclosing casing, indicated at 10 in the drawings, which covers the interrupter contacts, the governor and the controlling contacts. The casing 10 carries the nut 9 which is held to the casing but which is capable of rotating therein, and the nut is adapted to be threaded onto the post 2. The casing bears against a flange on the generator and, as above noted, completely houses the interrupter and the governor contacts as well as the governing mechanism. The condenser referred to above is mounted within the casing of the generator.

From the above, it will be noted that, as the engine increases in speed, the shaft 1 will also increase its speed, and when a certain predetermined speed is reached, the governor weight 8 moving out from the axis of the shaft will bring the disk 4 into engagement with the collar 3, thus short circuiting the primary coil, and this short circuiting of the primary coil, of course, cuts out the ignition current generated in the secondary coil. When the ignition current in the secondary coil is cut out, then the spark devices cease to act, and the speed of the engine will decrease, and when the speed again reaches a certain predetermined point, the metal disk 4 will be moved out of engagement with the coil 3 through the action of the spring arms 4$^a$ drawing the weights 8 toward the center of the shaft. This again establishes the primary circuit which takes up its normal action of producing an ignition current in the secondary generating coil.

From the above, it will be apparent that I have provided a governor having mechanical devices actuated by the engine, and that these devices operate through the ignition current generated to control the speed of the engine. A condenser, indicated at C, is bridged across the interrupter contacts I, as shown in Fig. 3 of the drawings, to prevent excessive sparking. I provide this condenser of sufficient capacity to also act to absorb the spark at the governor contacts.

While I have described in detail the short circuiting of the primary circuit for the control of the ignition current, it will be understood, of course, that the primary circuit may be broken by a slight obvious rearrangement of the parts described, the essential feature of my invention consisting in the cutting out of the ignition current generated when the engine reaches a predetermined speed and the reëstablishing of the ignition current when the speed drops below a certain point, thus controlling the speed of the engine by the ignition current generated by the engine.

It is obvious that minor changes in the details of construction and the arrangement of parts may be made within the scope of the invention described in the appended claims.

Having thus described the invention, what is claimed as new is:—

1. In combination with a gas engine, a unitary device comprising spark generating means having a shaft driven by said engine and including a governor for controlling the speed of the engine by controlling the current generated by said device.

2. In combination with a gas engine having a spark device, a unitary structure comprising an ignition generator, having a shaft, a centrifugal governor rotated by the engine, and devices controlled by the centrifugal governor for rendering the ignition generator ineffective when the engine reaches a predetermined speed whereby the speed of the engine may be controlled through the ignition current generated and supplied to the spark device.

3. In combination of a gas engine having a spark device, an electric generator for supplying ignition current to the spark device, said electric generator having primary and secondary coils, a driving shaft for the generator, an interrupter for the primary coil driven from said generator, and means controlled by the speed of said shaft and operated thereby for cutting out the effective action of the primary coil when the engine shaft reaches a predetermined speed.

4. The combination of a gas engine having a spark device, an electric generator having primary and secondary generating coils, a driving shaft in said generator, an interrupter for the primary coil driven from said shaft, a governor controlled by the speed of the said shaft for short-circuiting the primary coil when the engine shaft reaches a predetermined speed.

5. The combination of a gas engine having a spark device, an electric generator having primary and secondary generating coils, an interrupter for the primary coil, a governor controlled by the speed of the engine for short-circuiting the primary coil when the engine shaft reaches a predetermined speed, and a condenser for bridging the interrupter contacts of the primary circuit, said interrupter and governor and condenser forming with said generator a unitary structure, substantially as described.

6. An ignition device comprising a magneto, an interrupter mounted thereon, a governing device, and a common casing surrounding and inclosing said interrupter and governing device.

7. In combination with an ignition magneto, an interrupter mechanism therefor, a governing device, a terminal connected to said interrupter mechanism and governing device, a casing for the interrupter and governing device, and means carried by said terminal for securing said casing in place.

In testimony whereof I hereunto affix my signature.

HARRY RANDOLPH VAN DEVENTER.